F. C. HINCKLEY AND J. F. SKANE.
STOP MECHANISM.
APPLICATION FILED MAR. 23, 1918.

1,430,565.

Patented Oct. 3, 1922.
7 SHEETS—SHEET 1.

Inventors
Frank C. Hinckley
and
By James F. Skane
Mauro, Cameron, Lewis & Massie
Attorneys.

F. C. HINCKLEY AND J. F. SKANE.
STOP MECHANISM.
APPLICATION FILED MAR. 23, 1918.

1,430,565.

Patented Oct. 3, 1922.
7 SHEETS—SHEET 6.

Patented Oct. 3, 1922.

1,430,565

UNITED STATES PATENT OFFICE.

FRANK C. HINCKLEY AND JAMES F. SKANE, OF BRIDGEPORT, CONNECTICUT, ASSIGNORS TO COLUMBIA GRAPHOPHONE MANUFACTURING COMPANY, OF BRIDGEPORT, CONNECTICUT, A CORPORATION OF DELAWARE.

STOP MECHANISM.

Application filed March 23, 1918. Serial No. 224,338.

*To all whom it may concern:*

Be it known that we, FRANK C. HINCKLEY and JAMES F. SKANE, citizens of the United States of America, and residents of Bridgeport, Connecticut, have invented a new and useful Improvement in Stop Mechanism, which invention is fully set forth in the following specification.

This invention relates to stop mechanism, and particularly to stop mechanism especially designed for use in talking machines.

In machines of the latter type, a soundbox operatively connected to a sound-conveying member, which together will be referred to as a traveling element, has relative movement to a rotary record support, which support or any other suitable motor-driven rotary member, will be hereafter referred to as a rotating element, the sound-box and sound-conveying member generally being fed across the record support by the coaction of the former with the groove in the sound-record tablet. It is an object of this invention to provide a stop mechanism of improved construction which shall stop the rotation of the record support or other rotating element upon the completion of the traverse of the sound-box and sound-conveying member.

A further object of this invention is to provide stop mechanism of the character referred to with improved means whereby a predetermined number of revolutions of the rotating element must occur before said stop mechanism can come into action, whether the traveling element be stationary or not.

A still further object of the invention is to provide a stop mechanism of the type characterized with a manually operable controlling member by which the machine not only may be started but also may be stopped at any time independently of the automatic control thereof.

Yet another object of the invention is to provide a stop mechanism of the type characterized for use in connection with a motor hinged to its support, whereby the motor may be swung into and out of its normal position without the necessity of manually connecting and disconnecting the parts of the stop mechanism respectively connected to the movable motor and the stationary support.

Other objects relate to the provision of a stop mechanism of the type in question which is simple in construction, inexpensive to manufacture and install, and efficient in operation.

Stated broadly, the invention comprises, in combination, a rotating element, a traveling element, stop mechanism, a member for actuating the same shown as a rotating member, means operatively connected with the rotating element for moving said member into stop-actuating position, and means operatively connected with the traveling element for preventing the movement of said member into stop-actuating position while the traveling element continues its traverse, said member being moved into stop-actuating position upon the stopping of the traveling element by the coaction of an element carried thereby, shown as a cam, with the means operatively connected with the rotating element. Preferably, a predetermined number of revolutions of the rotating element must occur before said element or cam comes into approximate stop-actuating position or coacting relation with the means driven from the rotating element, said means operatively connected with the traveling element thereafter, and so long as the traveling element continues its traverse, preventing the operative engagement of said cam with said means driven from the rotating element to move said member into final stop-actuating position. Said stop mechanism, which may be either a brake or a switch, is operatively connected with a manual controlling member for moving said stop mechanism into starting position, said manual controlling member also being operable at any time to actuate said stop mechanism independently of the means for effecting its automatic operation.

The invention is capable of receiving a variety of mechanical expressions, two of which are shown on the accompanying drawings, but it is to be expressly understood that the drawings are for purposes of illustration only and are not to be construed as a definition of the limits of the invention, reference being had to the appended claims for that purpose.

In said drawings:—

Figures 3, 4:
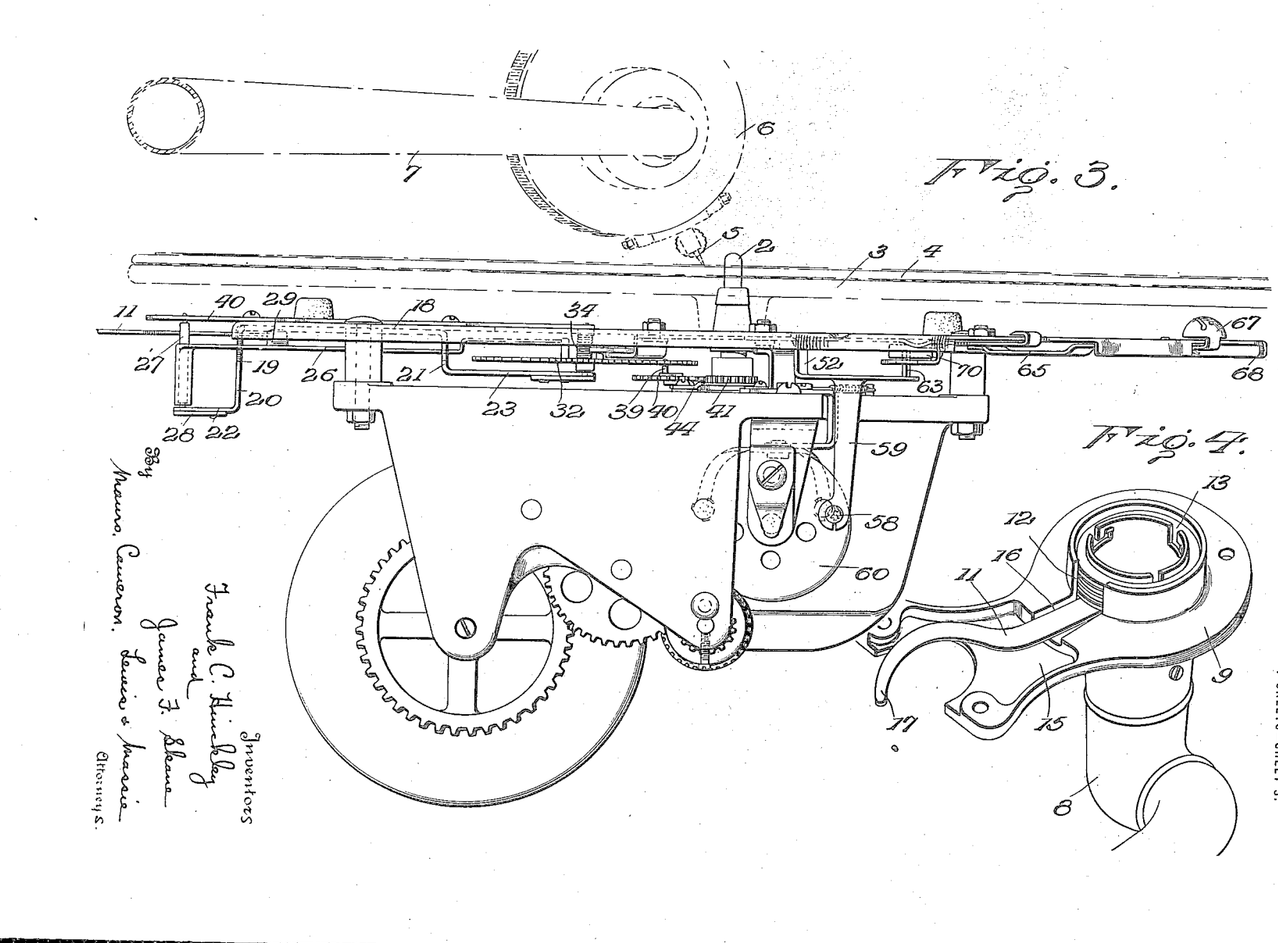
Fig. 3 is an end view of a talking machine provided with stop mechanism according to the present invention.
Fig. 4 is an inverted plan view showing the tone-arm bracket and the member frictionally driven by the tone-arm.

Referring in detail to the drawings wherein the same reference characters designate corresponding parts in the several figures, 1 represents a talking-machine cabinet of any suitable construction, 2 the driving spindle of the rotary record-support 3 designed to carry the usual record tablet 4, 5 the needle or stylus carried by the sound-box 6 operatively connected to the tone-arm 7, said tone-arm being mounted to enable the sound-box to traverse a record on said support in any suitable way, the form in the embodiment illustrated comprising a rotary elbow 8 connected to said tone-arm and journaled in a bracket 9 which may be attached to the talking-machine casing in any suitable way, as by screws 10. The elbow 8 is shown as extending through the bracket 9 and provided on its reduced lower end with an arm 11 frictionally connected thereto in any suitable way. In the form shown, said arm 11 is frictionally gripped to a shoulder or washers carried by the extension of the elbow 8 through the use of a spring 12 suitably retained in position as by a bayonet-lock washer 13. The tone-arm bracket 9 is shown as provided with a bifurcated extension 14 recessed on its under side, as shown at 15 (Fig. 4), to constitute a housing for the arm 11. Said arm extends through a slot 16 provided in the tone-arm bracket intermediate the elbow receiving space and the recess 15, which slot may serve as a limiting stop for the arm 11. At its outer end arm 11 is shown as curved and provided with an operating nose 17 for a purpose that will hereinafter appear.

Supported from the motor plate 18 is a bracket 19 shown as provided adjacent the end thereof with depending portions 20 and 21 from which extend horizontally projecting portions 22 and 23 respectively. Mounted on top of the motor plate 18 is a cover plate 24 extending throughout the length of the bracket 19 and, as shown, preferably provided at its outer end with an enlarged portion 25 adapted to fit between the bifurcations of the tone-arm bracket 14. Pivotally mounted between the horizontally extending portion 22 of the bracket 19 and the corresponding end of cover plate 24, is a lever 26, said lever being shown as carried by a pivot pin 27 retained in position by the thrust plate 28 suitably attached to portion 22 of bracket 19. Lever 26, intermediate its ends, is provided with an upstanding ear 29 with which the operating nose 17 of arm 11 is adapted to engage. Lever 26 extends through a limiting slot 30 in the depending portion 21 of bracket 19 and ends in an operating nose 31 as shown.

Rotatably mounted between the horizontally extending portion 23 of bracket 19 and the corresponding end of the cover plate 24, is a stop-actuating member shown as a gear 32, said gear being carried by a pin 33 and frictionally retained in any position to which it may be moved by a coiled spring 34 surrounding said pin 33 and extending between the gear and a washer 35 bearing against the cover plate 24. Gear 32 carries, adjacent its periphery, a relatively short upstanding pin or lug 36 and, adjacent its center, a relatively long upstanding pin or lug 37. Gear 32 is also provided with a cam surface for a purpose to be hereinafter explained, said surface being shown as in the form of a cam projection 38 occupying an arc of the periphery equal to the space occupied by two teeth.

Figure 10:
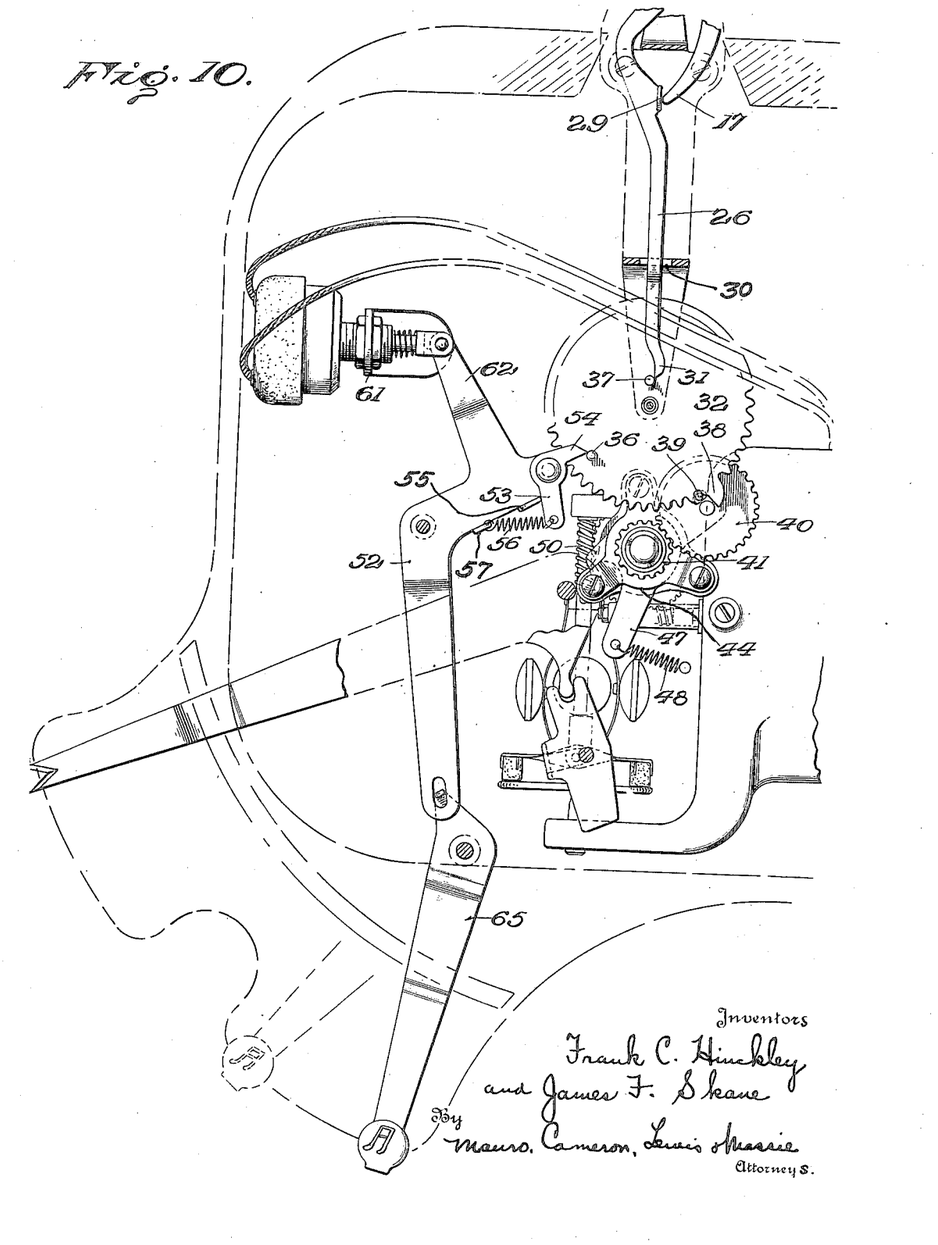
Fig. 10 is a plan view of a second embodiment of the invention but employing a switch in place of a brake for starting and stopping the machine.

Gear 32 is adapted to be rotated by engagement with its teeth of a pin 39, suitably mounted on a gear 40 in mesh with a gear 41 shown as mounted on the spindle 2. In the form shown, gear 40 is rotatably mounted by a pin 42 upon the end of a radial arm 43 which is rotatable about the axis of said spindle and is journaled on a depending flange of an escutcheon 44 which loosely embraces the spindle and is provided with a plurality of radial arms 45 which are suitably attached to the motor frame, as by screws 46. Projecting from the radial arm 43 is a second arm 47 to which is connected a spring 48 extending to a post 49 on the motor frame, which normally tends to maintain the pin 39 in coacting relationship with the teeth of the gear 32. Said arm 43 may also be provided with a projection or arm 50 which, by coaction with the escutcheon 44 as shown, constitutes a limiting stop for the rotary movement of the arm 43 under the tension of the spring 48. Pivoted on the motor frame at 51 is a stop-operating member 52 shown as a lever provided at its end adjacent the gear 32 with a pivoted pawl 53 having an operating nose 54 in the path of the pin or lug 36, said pawl being normally maintained against a stop ear 55 by a spring 56 connected thereto and to an ear 57 projecting from the lever 52. Operatively connected to the stop-operating member 52 is a stop device which, in the embodiment of Figs. 1 to 9 inclusive, is shown as a brake pad 58 carried by a depending arm 59 extending from said member, said pad being adapted to coact with any suitable element for stopping the machine such as a governor flange 60; and which, in the embodiment of Fig. 10, is shown as a switch 61 operatively connected to an arm 62 extending from said operating member 52. It is to be understood that the term "stop mechanism" as herein used is to be construed as generic to both a brake pad and a switch, or any other suitable stop device.

The stop-operating member 52 at its outer end is provided with an upstanding lug 63 received within an aperture or slot 64 in a manual operating member or lever 65 pivoted to the motor frame at 66 and extending to a position where it may be readily operated as shown at 67. In the form shown, said lever 65 is designed to oscillate in a limiting slot 68 provided at the periphery of the motor plate 18, in which slot may be used, if desired, any suitable form of retaining spring 69, while lever 65 is shown as provided with a spring 70 designed to engage the upstanding lug 63 and retain said lug at the right-hand side of the aperture or slot 64, said spring serving, however, to provide a cushion between the manual operating member and the stop device.

Figure 1:
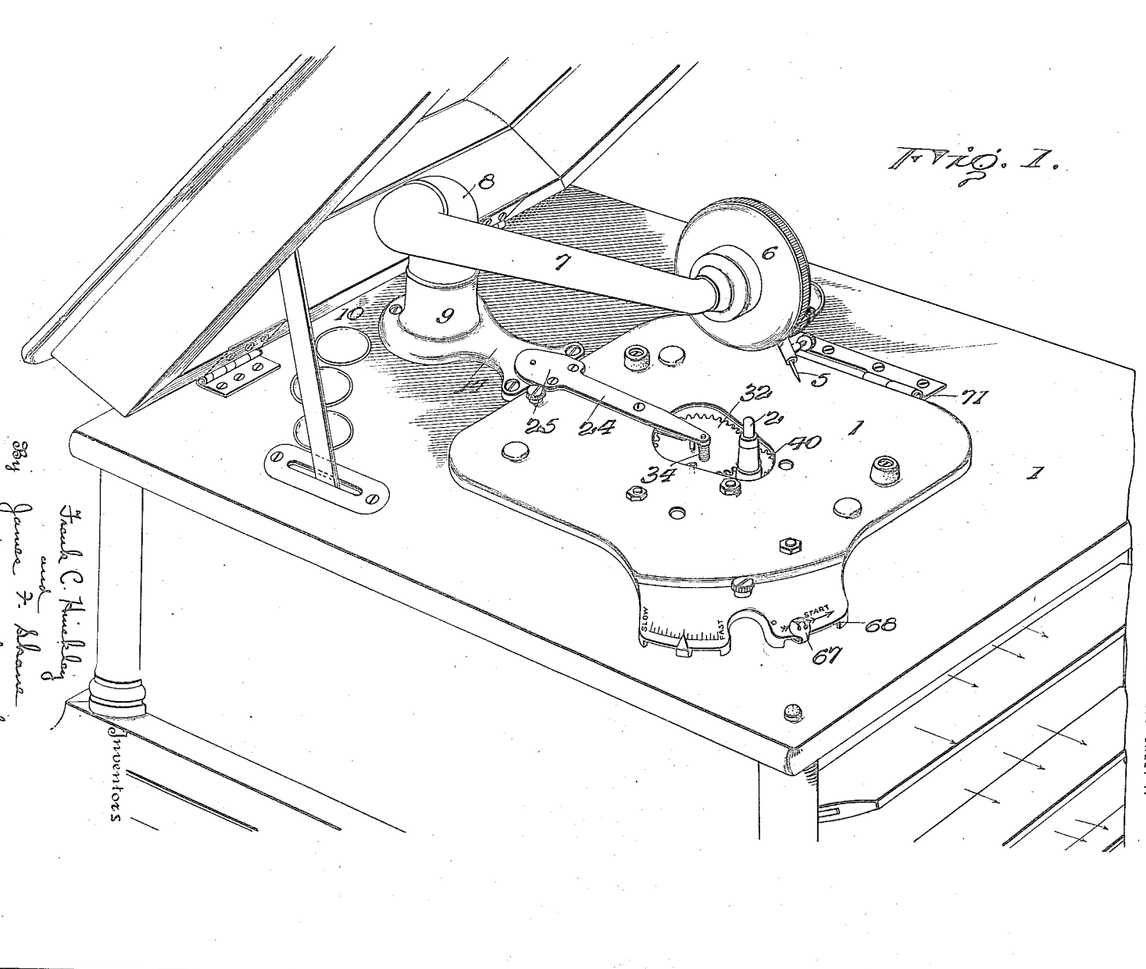
Fig. 1 is a perspective view of a talking machine provided with automatic stop mechanism according to the present invention.

In the form of the invention shown, the motor is mounted for movement into and out of its normal position about the hinge 71 as shown in Fig. 1. Owing to the relation of the arm 11 on the one hand, and the lever 26 carried by the bracket 19 on the other hand, said lever may move with the motor into and out of engagement with said arm, the ear 29 on said lever taking up its proper position with respect to the operating nose 17 on the arm when the motor is moved into its normal position, whereby no manual connection and disconnection of the parts constituting the train of mechanism between the tone-arm and the stop-actuating member 32 is necessary when the motor is moved into and out of its normal operative position.

Figure 2:
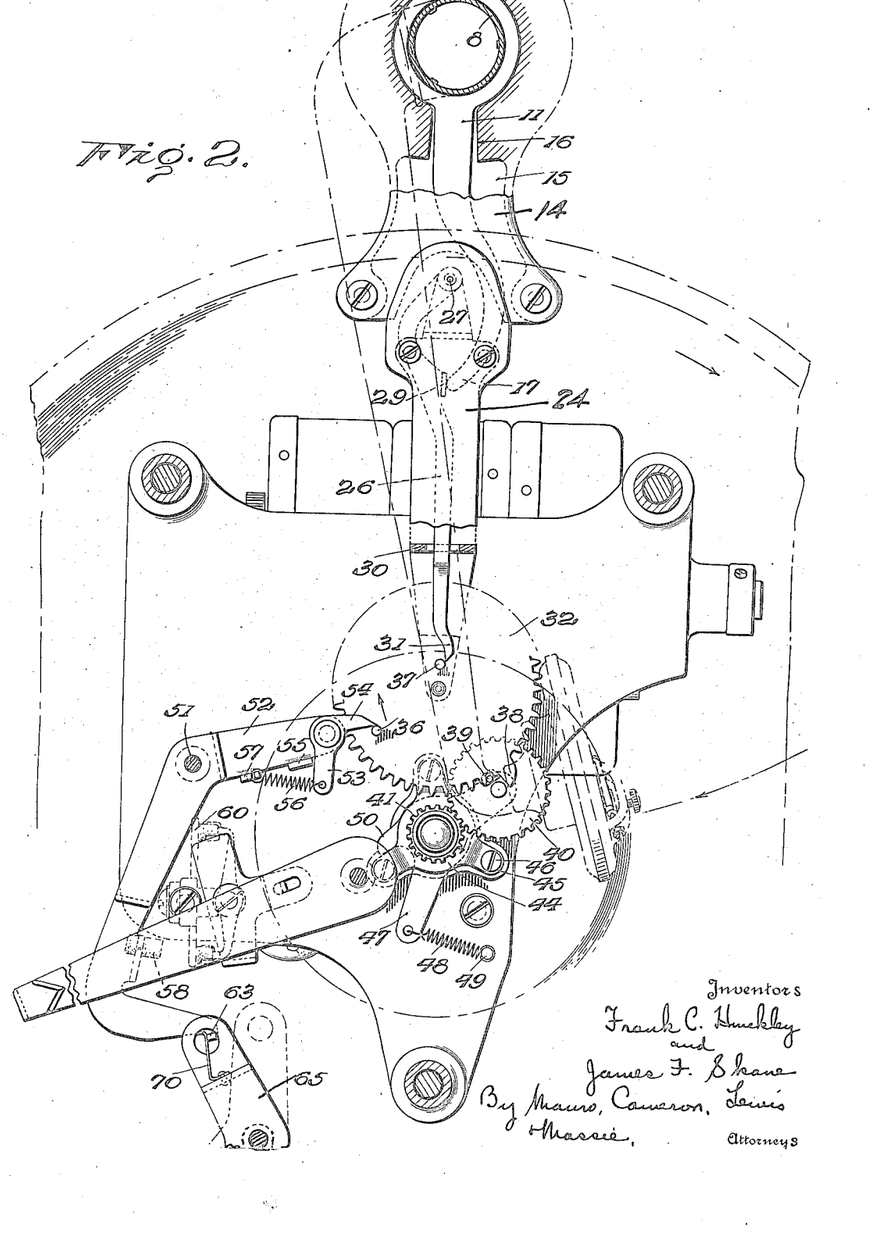
Fig. 2 is a plan view of the stop mechanism, showing the elements thereof in their relative position after a predetermined number of revolutions of the rotating element and prior to the automatic actuation of the stop mechanism.
Figure 5:
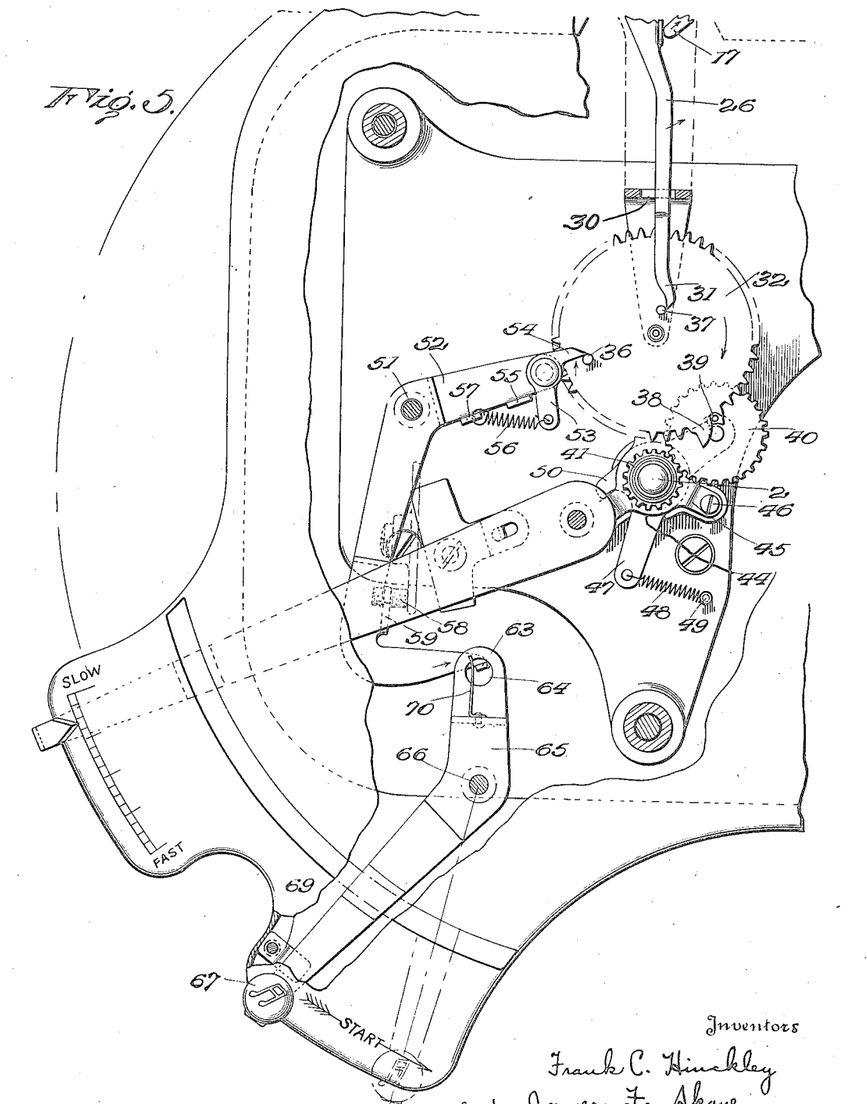
Fig. 5 is a plan view of the stop mechanism showing the relation of the elements upon automatic actuation of said stop mechanism.
Figure 6:
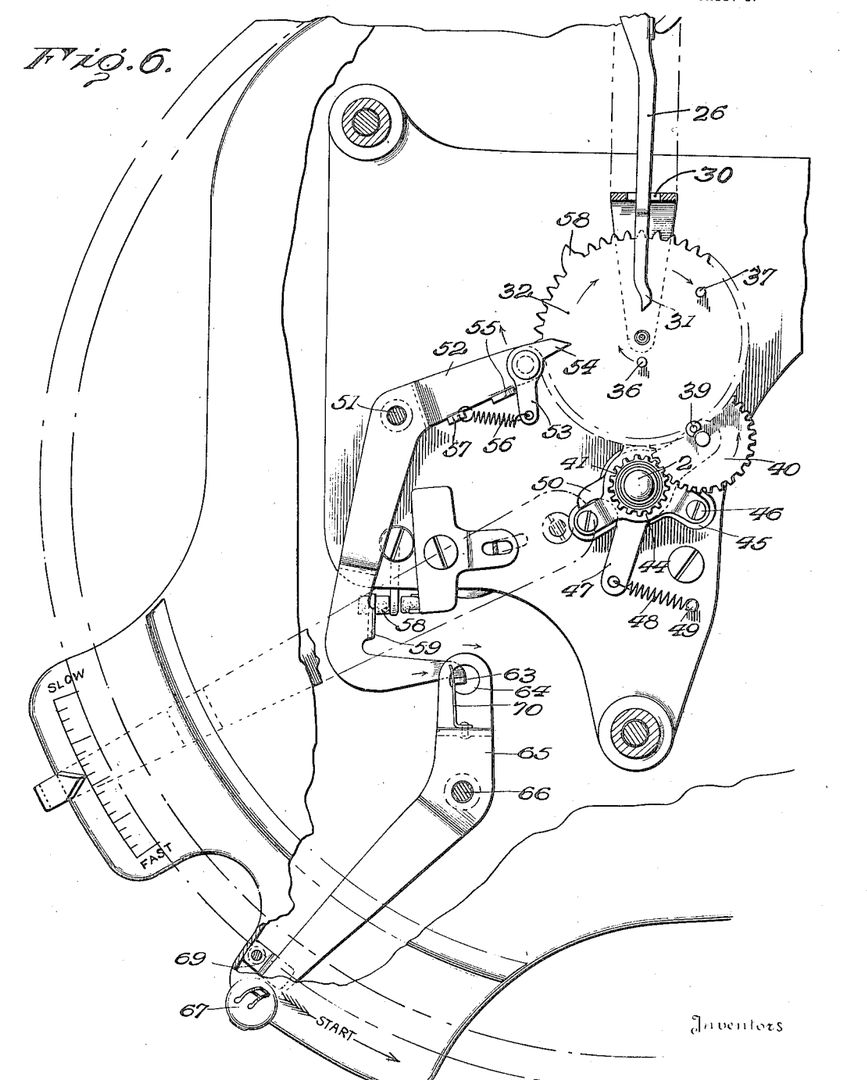
Fig. 6 is a plan view of the stop mechanism showing the relation of the elements upon manual actuation of the stop mechanism.
Figures 7, 8, 9:
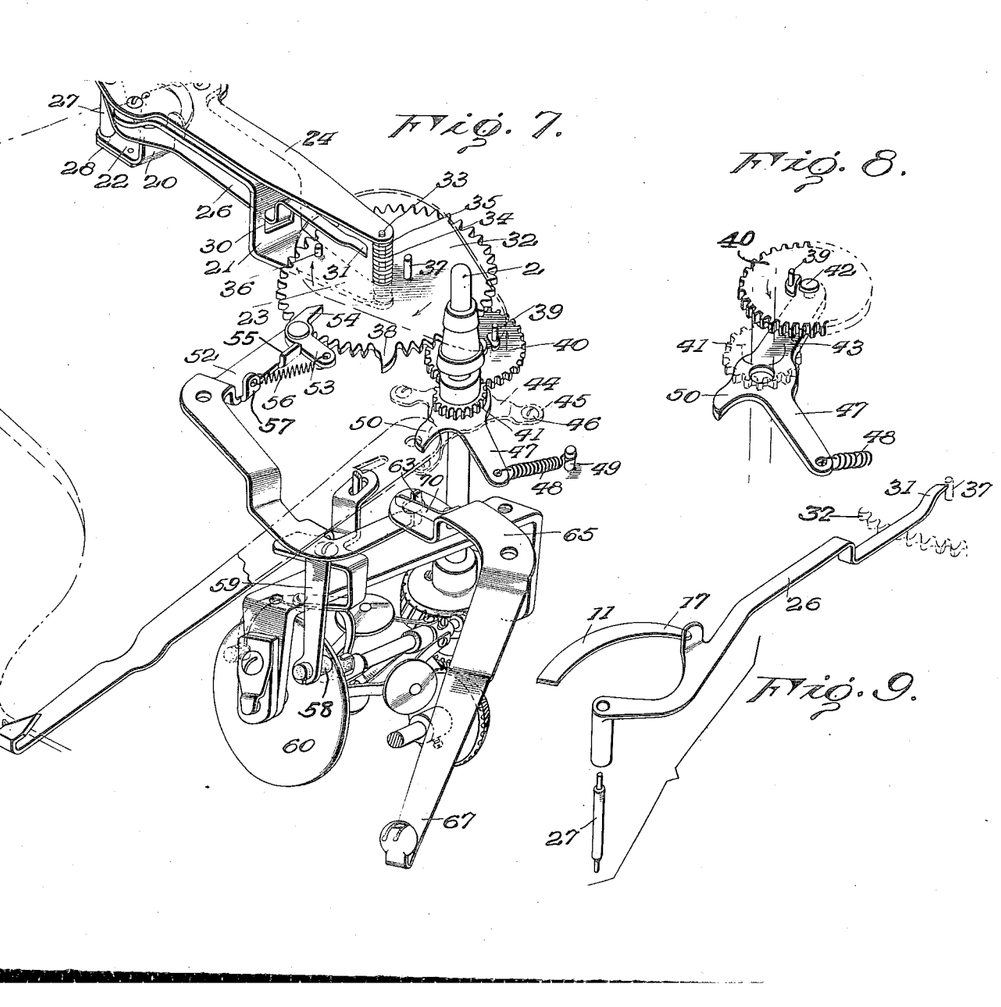
Fig. 7 is a perspective view of the stop mechanism detached from the talking machine.
Fig. 8 is a fragmentary detail of the radial arm and pin carrying gear.
Fig. 9 is a fragmentary detail of the lever driven from the tone-arm.

To start the machine, lever 65 is swung from the position shown in Fig. 6 to the position shown in Figs. 2 and 10. During this movement, the right-hand side of slot 64 engages upstanding lug 63 on lever 52 and, through movement of said lever, withdraws brake pad 58 from governor flange 60 on the one hand, or moves switch 61 to closed position on the other hand. The spindle 2, record-support 3, and record tablet 4 are now rotated by the motor. Assuming that the motor stopped with the parts in the position shown in Fig. 5, spindle 2, through gear 41, rotates gear 40 and, as the ratio of gear 40 to gear 41 is two to one, upon each second revolution of the spindle 2 pin 39 on the gear 40 engages one of the teeth of gear 32 and thereby intermittently advances said gear through increments corresponding to the pitch of said teeth. This will continue until gear 32 has made approximately a complete revolution. Assuming that there are forty-six teeth on said gear, it will then take ninety-two revolutions of the spindle 2 to advance the gear 32 into approximate stop-actuating position. In this latter position, pin or lug 36 is about to engage operating nose 54 of pawl 53, pin or lug 37 is engaged with operating nose 31 of lever 26, and cam projection 38 is ready to move into coacting relation with pin 39 on gear 40, all as shown in Fig. 2.

The sound-box having been operatively engaged with the sound-record tablet during the period when gear 32 was making its revolution, the sound-box and tone-arm now traverse the record and, through the frictional connection between the tone-arm elbow 8 and the arm 11, tend to drive said arm in a clockwise direction. Operating nose 17 on said arm, by engagement with ear 29 on the lever 26, similarly tends to drive said lever in a clockwise direction. The extent of movement of said arm and lever is, however, limited by the engagement of said arm and lever with the sides of the slots 16 and 30 respectively. When pin 39 engages the tooth of gear 32 immediately preceding the cam projection 38 and advances said gear in a clockwise direction, pin 37 engages nose 31 and moves lever 26 and arm 11 in an anti-clockwise direction, the frictional connection between said arm and the tone-arm elbow 8 permitting the latter movement. While the gear 40 is making its next revolution and the pin 39 is out of engagement with gear 32, the movement of the tone-arm causes arm 11 and lever 26 to move in a clockwise direction, operating nose 31 of said lever engaging pin 37 and rotating the gear 32 in an anti-clockwise direction through a distance equal to the pitch of the teeth. Upon pin 39 engaging gear 32, the gear is advanced clockwise again, and upon disengagement from said gear 32, the gear is rotated reversely by the lever 26. This continues as long as the traveling element continues its traverse.

When the traveling element has ceased to advance, lever 26 is no longer driven to engage pin 37 and move gear 32 in an anticlockwise direction. Therefore, upon the next rotation of pin 39 into engagement with gear 32, said pin engages the cam projection 38 and rotates said gear 32 through an increased increment, driving pin 36 into engagement with pawl 53 and actuating the stop mechanism. Should pin 39 engage the tip of cam projection 38 and not rotate said gear, the radial arm 43 may give against the tension of spring 48 so as to prevent injury to the parts. The spring-controlled pawl 53 constitutes a cushion between the stop-actuating member 32 and the stop device, preventing the latter from stopping the machine too abruptly, as said pawl will give against the tension of the spring to permit a gradual application of stopping force. Upon starting the machine, said pawl may also move with respect to lever 52 to permit the pin 36 to move therepast and make its complete revolution before assuming approximate stop-actuating relation thereto.

When lever 52 is engaged and operated to effect the actuation of the stop mechanism, upstanding lug 63, by engagement in slot 64, moves lever 65 over into the starting position shown in Fig. 5. Said lever may, however, be operated manually at any time during the operation of the machine and returned to starting position, in which event spring 70 on said lever will engage upstanding lug 63 on lever 52 and move said lever into stop-actuating position, the cushion provided by the coaction of said spring and the lug preventing the machine being stopped too abruptly. Thus the machine may be stopped manually at any time and independently of the mechanism for effecting the automatic actuation of the stopping device.

While the embodiments of the invention illustrated on the drawings have been described with considerable particularity, it is to be understood that the invention is not to be restricted thereto, as the same is capable of receiving a variety of mechanical expressions, some of which will readily suggest themselves to those skilled in the art, while certain features thereof are capable of use without other features thereof. Reference is therefore to be had to the appended claims for a definition of the limits of the invention.

What is claimed is:—

1. In combination, a rotating element, a traveling element, stop mechanism, a rotatable member for actuating the stop mechanism, means operatively connected with the rotating element for advancing the member into approximate stop-actuating position while the rotating element makes a predetermined number of revolutions, means operatively connected with the traveling element for preventing movement of the member into final stop-actuating position while the traveling element continues its traverse, and a cam on the member coacting with the first-named means for moving the member to actuate the stop mechanism upon the stopping of the traveling element.

2. In combination, a rotating element, a traveling element, stop mechanism, a gear provided with a member for actuating the stop mechanism, means operatively connected with the rotating element for advancing the member on the gear into approximate stop-actuating position while the rotating element makes a predetermined number of revolutions, means operatively connected with the traveling element for preventing movement of the member on the gear into final stop-actuating position while the traveling element continues its traverse, and a cam-tooth on the gear coacting with the first-named means for rotating the gear to actuate the stop mechanism upon the stopping of the traveling element.

3. In combination, a rotatable element, a traveling element, stop mechanism, a member for actuating the stop mechanism, means operatively connected with the rotating element for advancing the member into approximate stop-actuating position by predetermined increments while said rotating element makes a predetermined number of revolutions, and means on the member coacting with the first-named means for advancing the member by an increased increment into final stop-actuating position upon the stopping of the traveling element.

4. In combination, a rotatable element, a traveling element, stop mechanism, a rotatable member for actuating the stop mechanism, means operatively connected with the rotating element for advancing the member into approximate stop-actuating position while the rotating element makes a predetermined number of revolutions, means operatively connected with the traveling element for thereafter rotating the member intermittently in the opposite direction, and a cam on the member coacting with the first-named means upon the stopping of the traveling element for rotating the member to actuate the stop mechanism.

5. In combination, a rotatable element, a traveling element, stop mechanism, a rotatable member adapted to actuate the stop mechanism, means operatively connected with the traveling element for rotating the member in one direction, means operatively connected with the rotating element for rotating the member in the opposite direction, and a cam on the member coacting with the last-named means for rotating the member into stop-actuating position, said cam on the member becoming operatively related to the last-named means only after a predetermined number of revolutions of the rotating element.

6. In combination, a rotatable element, a traveling element, stop mechanism, a member adapted to actuate the stop mechanism, means operatively connected with the traveling element and coacting with an element on the member for moving the member in one direction, means operatively connected with the rotating element for moving the member in the opposite direction, and a second element on the member coacting with the last-named means for moving the member to actuate the stop mechanism, the elements on the member becoming operatively related to the first and second-named means only after a predetermined number of revolutions of the rotating element.

7. In combination, a rotatable element, a traveling element, stop mechanism, a member for actuating the stop mechanism, means operatively connected with the rotating element for advancing the member into approximate stop-actuating position by predetermined increments while the rotating element makes a predetermined number of revolutions, means operatively connected with the traveling element for preventing movement of the member into final stop-actuating position while the traveling element continues its traverse, and means on the member coacting with the first-named means for advancing the member by an increased increment into final stop-actuating position upon the stopping of the traveling element.

8. In combination, a rotating element, a traveling element, stop mechanism, a rotatable member adapted to actuate the stop mechanism and provided with a cam surface, means driven from the rotating element adapted to engage the cam surface and move the member into stop-actuating position, and means controlled by the traveling element for moving the cam surface out of operative relation to the last-named means while the traveling element continues its traverse.

9. In combination, a rotating element, a traveling element, stop mechanism, a rotatable member provided with means adapted to actuate the stop mechanism and with a cam projection, means driven from the rotating element adapted to engage the cam projection and move the member into stop-actuating position, and means controlled by the traveling element for moving the cam projection out of operative relation to the last-named means while the traveling element continues its traverse.

10. In combination, a rotating element, a traveling element, stop mechanism, a gear provided with means adapted to actuate the stop mechanism and a cam tooth, means driven from the rotating element adapted to engage the cam tooth and move the gear into stop-actuating position, and means controlled by the traveling element for moving the cam tooth out of operative relation to the last-named means while the traveling element continues its traverse.

11. In combination, a rotating element, a traveling element, stop mechanism, a rotatable member adapted to actuate the stop mechanism and provided with a cam surface, means driven from the rotating element for moving the cam surface into approximate stop-actuating position and for engaging the cam surface and moving the member into final stop-actuating position upon the stopping of the traveling element, and means controlled by the traveling element for moving the cam surface out of operative relation to the last-named means while the traveling element continues its traverse.

12. In combination, a rotating element, a traveling element, stop mechanism, a rotatable member adapted to actuate the stop mechanism and provided with a cam surface, means driven from the rotating element for rotating the cam surface into approximate stop-actuating position and for engaging the cam surface and moving the member into final stop-actuating position upon the stopping of the traveling element, and means controlled by the traveling element for intermittently rotating the cam surface out of operative relation to the last-named means while the traveling element continues its traverse.

13. In combination, a rotating element, a traveling element, stop mechanism, a member adapted to actuate the stop mechanism, means operatively connected with the rotating and traveling elements for moving the member in opposite directions, and a cam on the member, adapted to cooperate with the means operatively connected with the rotating element upon the stopping of the traveling element, for moving the member into stop-actuating position.

14. In combination, a rotating element, a traveling element, stop mechanism, a rotatable member adapted to actuate the stop mechanism, means operatively connected with the traveling element for rotating the member in one direction, means driven from the rotating element for intermittently rotating the member in the opposite direction, and means on the member coacting with the last-named means upon the stopping of the traveling element to rotate the member into stop-actuating position.

15. In combination, a rotating element, a traveling element, stop mechanism, a member adapted to actuate the stop mechanism, means driven from the rotating element for moving the member into approximate stop-actuating position by predetermined increments, and means on the member coacting with the first-named means upon the stopping of the traveling element to move the member by an increased increment into final stop-actuating position.

16. In combination, a rotating element, a traveling element, stop mechanism, a member adapted to actuate the stop mechanism, means driven from the rotating element for moving the member into approximate stop-actuating position by predetermined increments, means controlled by the traveling element for preventing movement of the member into final stop-actuating position while the traveling element continues its traverse, and means on the member coacting with the first-named means upon the stopping of the traveling element to move the member by an increased increment into final stop-actuating position.

17. In combination, a rotating element, a traveling element, stop mechanism, a gear member provided with an element adapted to actuate the stop mechanism, means controlled by the traveling element coacting with a second element on the member for rotating the member in one direction, means driven from the rotating element for rotating the member in the opposite direction, and a third element on the member coacting with the last-named means for rotating the member into stop-actuating position.

18. In combination, a rotating element, a traveling element, stop mechanism comprising a member provided with a pawl, a rotary member adapted to actuate the stop mechanism by engagement with the pawl, the pawl thereafter moving relatively to the first-named member to permit further rotation of the rotary member, means operatively connected with the rotating element for moving the rotary member into pawl-engaging position, and means operatively connected to the traveling element for preventing movement of the rotary member into pawl-engaging position while the traveling element continues its traverse.

19. In combination, a rotating element a traveling element, stop mechanism, a member adapted to actuate the stop mechanism, means operatively connected with the rotating element for moving the member into stop actuating position, the means comprising a gear, an arm rotatable about the axis of the gear and carrying a second gear in mesh therewith, and a spring for maintaining the second gear in operative relation to the member, and means operatively connected to the traveling element for preventing movement of the member into stop-actuating position while the traveling element continues its traverse.

20. In combination, a rotating element, a traveling element, stop mechanism, a gear adapted to actuate the stop mechanism and provided with a cam projection, means operatively connected with the rotating element for rotating the gear, the means comprising a pin adapted to rotate the gear and to engage the cam-projection to move the gear into stop-actuating position, and means operatively connected with the traveling element for preventing the engagement of the pin and cam projection while the traveling element continues its traverse.

21. In combination, a rotating element, a traveling element, stop mechanism, coacting members operatively related to the rotating and traveling elements and adapted to actuate the stop mechanism automatically upon the stopping of the traveling element, and manually-operable means for moving the stop mechanism into starting position and for actuating the stop mechanism, the last-named means consisting of two coacting members having a pin and slot connection and a spring for normally maintaining the members in predetermined relationship.

22. In combination, a rotating element, a traveling element, stop mechanism, a rotatable member for actuating the stop mechanism adapted to have complete free rotation in one direction, and to have free oscillatory movement, and adapted, at one stage of its movement in one direction, to actuate the stop mechanism, means actuated by the rotating element adapted to intermittently move the rotatable member in the direction to actuate the stop mechanism, and adapted to move the member during a plurality of revolutions of the rotating element to approximate stop-actuating position, means actuated by the traveling element adapted to intermittently move the rotatable member alternately to the movement by the rotating element, and in opposite direction to maintain the rotatable member in such approximate stop-actuating position, the rotatable member adapted to be moved to stop-actuating position upon cessation of the movement of the traveling element.

23. In combination, record rotating means, sound reproducing means associated therewith, means for stopping the record rotating means at the completion of the record, said last-named means including means for both automatic and manual stopping.

24. In combination, record rotating means, sound reproducing means associated therewith, means for stopping the record rotating means at the completion of the record, said last-named means including means for both automatic and manual stopping, and means preventing the operation of said last-named means during the initial record playing period.

25. In combination, record rotating means, sound reproducing means associated therewith, means associated with the movement of the sound reproducing means for automatically stopping the record rotating means at the completion of the record, and other means associated with said stopping means for manually effecting such stopping.

26. In combination, record rotating means, sound reproducing means associated therewith, power means for said record rotating means, and power cut-off means adapted to be actuated at the completion of the record, said last-named means including means for both automatic and manual control.

27. In combination, record rotating means, sound reproducing means associated therewith, power means for said record rotating means, power cut-off means adapted to be actuated at the completion of the record, said last-named means including means for both automatic and manual control, and means for preventing the automatic operation of said power cut-off means during the initial record playing period.

28. In combination, record rotating means, sound reproducing means associated therewith, power means for said record rotating means, power cut-off means, a member for actuating said power cut-off means, means operatively connected with the record rotating means for advancing said member into approximate actuating position by predetermined increments while said record rotating means makes a predetermined number of revolutions.

29. In combination, record rotating means, sound reproducing means associated therewith, power means for said record rotating means, power cut-off means, a member for actuating said power cut-off means, means operatively connected with the record rotating means for advancing said member into approximate actuating position by predetermined increments while said record rotating means makes a predetermined number of revolutions, and means for advancing said member by an increased increment into final actuating position upon cessation of movement of the sound reproducing means with relation to the record rotating means.

In testimony whereof we have signed this specification.

FRANK C. HINCKLEY.
JAMES F. SKANE.